US005623257A

United States Patent [19]

Bachhuber

[11] Patent Number: 5,623,257

[45] Date of Patent: Apr. 22, 1997

[54] METHOD AND APPARATUS FOR SUPPLYING POWER TO THE RECEIVER OF A MOTOR VEHICLE LOCKING SYSTEM

[76] Inventor: Anton Bachhuber, Ahornstrasse 8, 84085 Langquaid, Germany

[21] Appl. No.: 392,079

[22] Filed: Feb. 22, 1995

Related U.S. Application Data

[63] Continuation-in-part of Ser. No. 29,024, Mar. 10, 1993, abandoned.

[30] Foreign Application Priority Data

Mar. 10, 1992 [EP] European Pat. Off. .............. 92104084

[51] Int. Cl.[6] .............................. G08C 19/00; H04B 1/16

[52] U.S. Cl. .............................. 340/825.69; 340/825.31; 340/825.72; 455/343

[58] Field of Search ......................... 340/825.31, 825.69, 340/539, 825.72, 541, 825.44; 361/172; 70/277; 455/38.3, 343

[56] References Cited

U.S. PATENT DOCUMENTS

| | | |
|---|---|---|
| 4,688,036 | 8/1987 | Hirano et al. . |
| 4,825,210 | 4/1989 | Bachhuber . |
| 4,835,531 | 5/1989 | Sato . |
| 4,860,005 | 8/1989 | DeLuca . |
| 4,897,835 | 1/1990 | Gaskill et al. . |
| 4,914,716 | 4/1990 | Takahashi . |
| 5,032,835 | 7/1991 | DeLuca . |
| 5,095,308 | 3/1992 | Hewitt . |
| 5,115,236 | 5/1992 | Koehler . |
| 5,274,843 | 12/1993 | Murai et al. . |
| 5,548,832 | 8/1996 | Karam .................................... 455/343 |

FOREIGN PATENT DOCUMENTS

| | | |
|---|---|---|
| 0215291 | 3/1987 | European Pat. Off. . |
| 0311112 | 4/1989 | European Pat. Off. . |

*Primary Examiner*—Michael Horabik
*Assistant Examiner*—Edward Merz
*Attorney, Agent, or Firm*—Herbert L. Lerner; Laurence A. Greenberg

[57] ABSTRACT

An electronic motor vehicle locking system has a receiver which is mounted in the motor vehicle, which is supplied by a battery power supply, and which is remote-controlled by a handheld transmitter supplying coded control signals. A clocked operating switch turns the power supply to the receiver on and off. The receiver may be remotely controlled with infrared light control signals or with radio control signals. A method for the clocked actuation of the operating switch includes operating the operating switch during a first waiting period with given intervals between turn-ons of the power supply; and operating the operating switch in a clocked fashion during a second waiting period after the first waiting period with intervals between the turn-ons of the power supply which are longer than the given intervals of the first waiting period, if the receiver received no control signals during the first waiting period. An apparatus for the clocked actuation of the operating switch includes a timer, as for instance a microprocessor with a clock pulse generator.

21 Claims, 5 Drawing Sheets

METHOD AND APPARATUS FOR SUPPLYING POWER TO THE RECEIVER OF A MOTOR VEHICLE LOCKING SYSTEM

CROSS-REFERENCE TO RELATED APPLICATION

This is a continuation-in-part of application Ser. No. 08/029,024, filed Mar. 10, 1993 now abandoned.

BACKGROUND OF THE INVENTION

Field of the Invention

The invention relates to a method and an apparatus for the clocked actuation of an operating switch which turns a power supply on and off for a battery-supplied receiver of an electronic motor vehicle locking system; the receiver is remote-controllable by a handheld transmitter with coded control signals and is mounted in the motor vehicle; and the receiver being remotely-controllable with infrared light control signals or radio control signals, for example.

Generic disclosure with regard to the invention and specific structure for implementing the inventive concept may be found in U.S. Pat. No. 4,825,210 to Bachhuber et al., for instance. Further, related information may be found in U.S. Pat. No. 4,835,531 to Sato. These patents are herein incorporated by reference.

The point of departure of the invention relative to the prior art is the fact that to save electricity during parking or in other words during waiting periods, and thus to save energy stored in the battery of the motor vehicle, it is known to clock the power supply of the receiver of a motor vehicle locking system.

One main problem of such methods is to find a way in which to avoid total discharges of the battery if the motor vehicle is parked for a long time and the locking system is not actuated. During such a waiting period, the receiver might receive many different control signals, but none of them would be intended to actuate the locking system. In fact, it can happen that during such a waiting period the receiver will receive many control signals that are intended for other motor vehicles, while in contrast, the control signal intended for that particular motor vehicle may sometimes not be received for a week or even longer.

It is accordingly an object of the invention to provide a method and an apparatus for supplying power to the receiver of a motor vehicle locking system, which overcome the above-mentioned disadvantages of the heretofore-known methods and devices of this general type and which avoid total discharges during the waiting time if at all possible.

SUMMARY OF THE INVENTION

With the foregoing and other objects in view there is provided, in accordance with the invention, in a process for operating an electronic motor vehicle locking system including a receiver being mounted in the motor vehicle, being supplied by a battery power supply, and being remote-controlled by a handheld transmitter supplying coded control signals, and an operating switch for turning the power supply on and off, the receiver being remotely controlled with infrared light control signals or radio control signals, a method for the clocked actuation of the operating switch, which comprises operating the operating switch during a first waiting period with given intervals between turn-ons of the power supply, during which intervals no power is supplied to the receiver; and, if the receiver received no control signals during the first waiting period, operating the operating switch in a clocked fashion during a second waiting period with intervals between the turn-ons of the power supply being longer than the given intervals in the first waiting period.

The energy consumption of the receiver is reduced considerably by clocking the power supply. Accordingly, the invention does more than merely use components that are as thrifty as possible in terms of power, although doing so is certainly advantageous in the invention.

In accordance with another mode of the invention, there is provided a method which comprises setting the intervals to be vanishingly short in the first waiting period so that the operating switch supplies the receiver with power continuously during the first waiting period, and setting the intervals to have finite length between turn-on phases in the second waiting period so that the operating switch is operated in clocked fashion. These steps carry the advantage of being able to avoid delays in actuations of the locking system in the first waiting period, which lasts a day or several days, for instance.

In accordance with a further mode of the invention, there is provided a method which comprises setting the intervals in the first waiting period to have finite size so that the operating switch is operated at a higher clock frequency in the first waiting period than during the second waiting period. In this way, during all waiting periods, it is possible to save an especially large amount of energy stored in the battery.

In accordance with an added mode of the invention, there is provided a method which comprises increasing the length of the clock intervals even further during other waiting periods after the second waiting period. In this way it is possible to span especially long waiting periods thriftily.

In accordance with an additional mode of the invention, there is provided a method which comprises increasing the length of the clock intervals substantially uniformly with time. This makes the irritation to the motor vehicle user, due to thinking his or her locking system might have become defective, as slight as possible.

In accordance with yet another mode of the invention, there is provided a method which comprises repeatedly transmitting the coded control signals in succession from the handheld transmitter during a transmission period upon a single actuation of a tripping device of the handheld transmitter, setting the clock intervals to last a shorter time than the transmission period, and temporarily supplying the receiver with power through the operating switch, at least during an entire duration of a reception of a complete code, if fractional signals are received. Despite relatively long intervals, having to operate the hand-held transmitter only a few times, for instance only a single time, in order to actuate the locking system, is advantageous.

In accordance with yet a further mode of the invention, there is provided a method which comprises receiving control signals which do not contain a code authorized for actuating the locking system, and then setting the clock frequency of the actuation of the operating switch to be at least approximately the same as it would have been without receiving the control signals which do not contain the code authorized for actuating the locking system. The advantage of these steps is in being able to continue the power-saving clocked operation unimpeded, even if the receiver of the parked motor vehicle receives control signals that actually are intended only for other motor vehicles, or in other words are intended for actuating the locking systems of other motor vehicles.

In accordance with yet an added mode of the invention, there is provided a method which comprises receiving control signals which contain a code that is authorized for actuating the locking system, and then setting the clock frequency of the actuation of the operating switch to match the clock frequency of actuations that prevail during the first waiting period. These steps make it possible to have the first waiting period begin again at the right time.

In accordance with yet an additional mode of the invention, there is provided a method which comprises receiving control signals which contain a code that is authorized for actuating the locking system, and then setting the clock frequency of the actuation of the operating switch to not match the clock frequency of the actuations that prevail during the first waiting period again until the motor vehicle engine has been started first. The advantage of these steps is in not having the first waiting time begin again until the battery of the motor vehicle has recharged.

In accordance with again another mode of the invention, there is provided a method which comprises measuring the voltage of the battery at least periodically during waiting periods, and defining the interval as a function of the measured voltage of the battery. The voltage of the battery may be measured from the second waiting period on. In this way, the first waiting time begins again only once the motor vehicle battery has been recharged sufficiently.

With the objects of the invention in view, there is also provided, in an electronic motor vehicle locking system including a receiver being mounted in the motor vehicle, a battery power supply for supplying the receiver, a remote-controlled handheld transmitter for supplying the receiver with coded control signals, and an operating switch for turning the power supply to the receiver on and off, an apparatus for the clocked actuation of the operating switch, comprising a timer, the timer operating the operating switch during a first waiting period with given intervals between turn-ons of the power supply; and, if the receiver received no control signals during the first waiting period, the timer operating the operating switch in a clocked fashion during a second waiting period immediately following the first waiting period with intervals between the turn-ons of the power supply being longer than the given intervals. This makes it possible to carry out the method of the invention with little effort.

In a preferred embodiment, the clock pulse generator is embedded in a microprocessor which processes the timing program. In other words, the microprocessor is incorporated in the receiver and it connects the receiver to the power supply in a clocked fashion.

In accordance with another feature of the invention, the timer includes a flip-flop. This is an example that requires little effort. In accordance with a further feature of the invention, the timer includes a frequency demultiplier for reducing the clock frequency of the timer. This offers a further opportunity for varying the length of the intervals, instead of having to vary the frequency of the timer.

In accordance with a concomitant feature of the invention, the timer includes a storage capacitor for storing operating energy for operating the timer being required at least until the next actuation of the operating switch. At little effort, a power supply is offered to the timer that is unimpaired by the clocking of the power supply of the receiver.

Other features which are considered as characteristic for the invention are set forth in the appended claims.

Although the invention is illustrated and described herein as embodied in a method and an apparatus for supplying power to the receiver of a motor vehicle locking system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
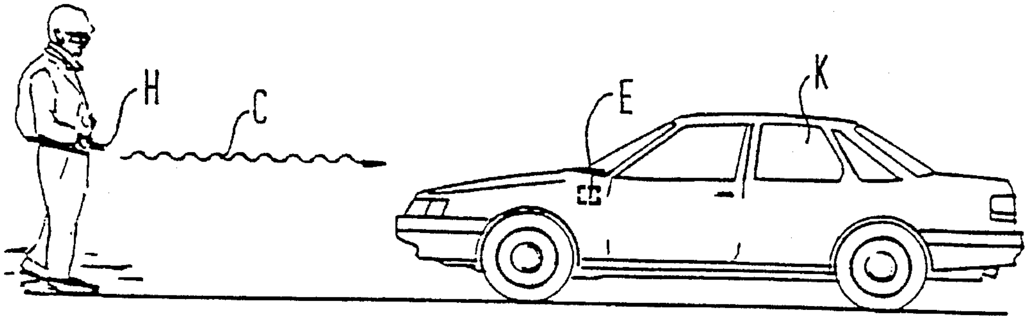
FIG. 1 is a side-elevational view of a person transmitting control signals with a handheld transmitter, in order to actuate a locking system mounted in a motor vehicle.

Referring now in detail to the figures of the drawing, which are shown as simply as possible, and first, particularly, to FIG. 1 thereof, there is seen a person who is transmitting coded control signals C with a handheld transmitter H, in order to actuate a locking system mounted in a motor vehicle K. In other words, the handheld transmitter H transmits infrared control signals C or radio control signals C.

Figure 2:
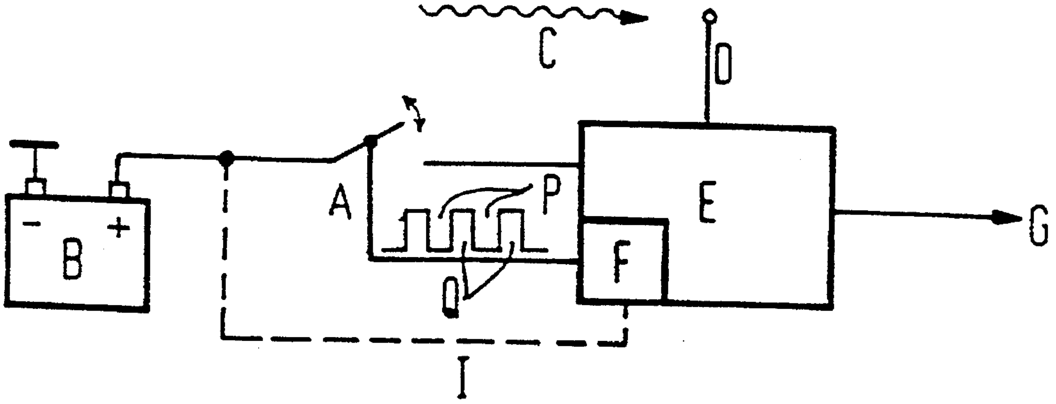
FIG. 2 is a simplified basic schematic and block circuit diagram of a layout of a configuration mounted in the motor vehicle, for carrying out the method of the invention.

The locking system includes a receiver E, shown in FIG. 2, which receives the control signals C through its antenna, that is symbolically indicated at reference symbol D herein, and evaluates them as to whether or not the code of the control signal C indicates that the person transmitting is authorized to actuate the locking system. Depending on the result, the receiver E then either does or does not output an actuation signal G that actuates the locks of the motor vehicle K.

A power supply, or in other words a battery B of the motor vehicle K, is under a constant load from the receiver E while the vehicle is parked, especially if the waiting periods last a very long time, possibly even several weeks. One main problem of such power supplies is then how to avoid total discharges of the battery B, which after all not only has to supply power to the receiver E during the waiting periods and eventually to open the doors when the motor vehicle is entered, but which also and above all must supply power to the starter the next time that the engine is started.

Above all, a total discharge of the battery B should accordingly be avoided if the motor vehicle K is left parked for a long time and the locking system is not actuated. The receiver E in these waiting periods might moreover receive many different control signals C, but no signals that are intended to actuate the locking system. It may in fact happen that the receiver E during these waiting periods receives many control signals C that are intended only for other motor vehicles, while in contrast the control signal C that is intended for the particular motor vehicle K in this case may not be received until a week later, or even after that. During the waiting periods, the receiver E accordingly still uses a more or less large amount of current in order to check whether control signals C received in the meantime originate from the authorized person or the authorized handheld transmitter H, or from unauthorized persons or transmitters.

The invention largely avoids a total discharge during waiting periods by clocking the power supply of the receiver E in a special way. The energy consumption of the receiver E is reduced considerably by clocking the power supply B.

FIG. 2 shows an operating switch A, which for this purpose is clocked during waiting times and turns the power supply B alternately on and off. The switch A belongs to the receiver E, which can be remote-controlled with the control signals C by means of the handheld transmitter H. In the example shown, this operating switch A is clocked by a timer F by means of a clock pulse sequence Q-Q-Q, in which clock pulses Q are separated from one another by variable-length intervals P. In the preferred embodiment, the clock pulse generator is a microprocessor F, which is supplied with voltage and current from the battery B through the line I. The microprocessor may, for instance, be a Motorola 68 series chip (e.g. Motorola 68HC05B6). When the microprocessor issues a pulse Q (digital 1), then the switch A is closed and the receiver E is supplied with current and voltage from the battery. When the microprocessor issues a zero pulse P (no pulse=pause), then it is in standby mode. The switch A is open, and the receiver E is off. The clocked operation of the receiver, therefore, saves energy.

Figure 3:
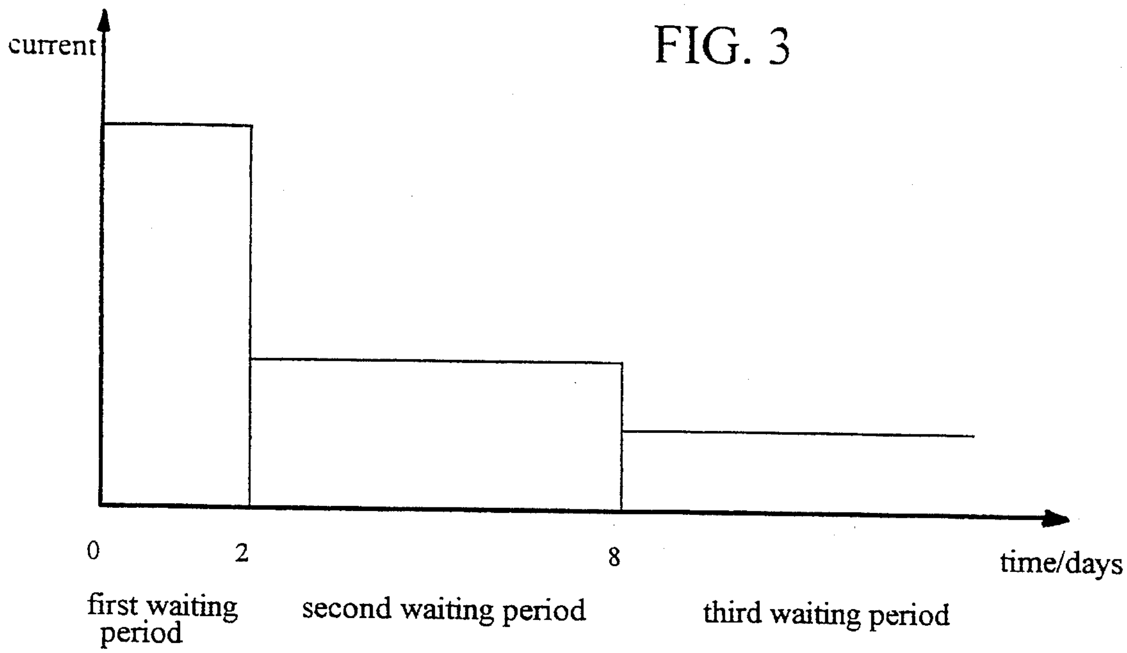
FIG. 3 is a diagrammatic illustration of the averaged current consumption of the receiver during three different operating periods.
Figure 5:
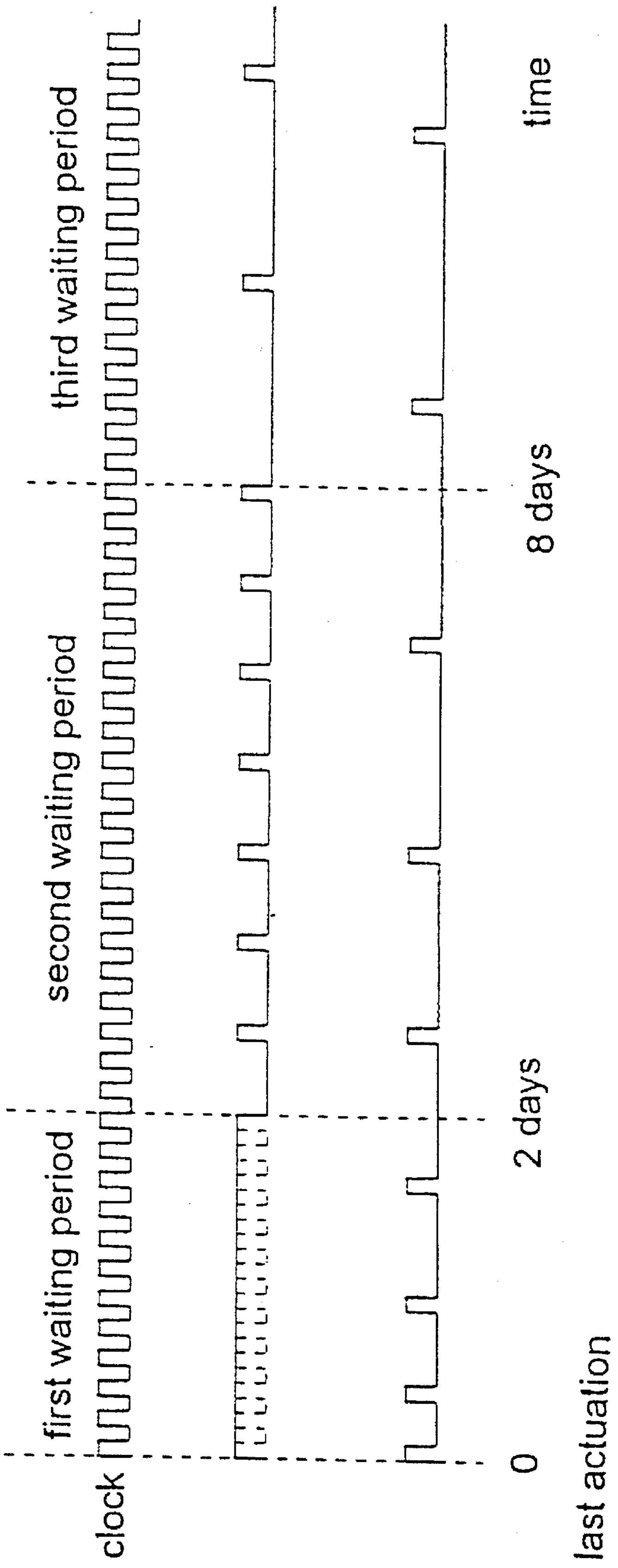
FIG. 5 is duty cycle diagram with the discontinuously altered duty cycle of FIG. 3 on the top line, and the continuously altered duty cycle of FIG. 4 on the bottom line.

Referring now to FIG. 3 and the upper line of FIG. 5, the averaged energy consumption over three different time periods is continously reduced. The first waiting period is approximately two days, during which the current consumed by the receiver E is by far the greatest. The receiver E may thereby be continuously connected to the battery or it may be clocked with very short pauses (dashed lines in the upper duty cycle of FIG. 5). That clocking frequency may thereby correspond to the basic clock pulse . . . After the first period, the power consumption is reduced for the next six days. After that, the duty cycle of the switch is further reduced in the third waiting period, if no valid signal has been received from the handheld transmitter.

Figure 4:
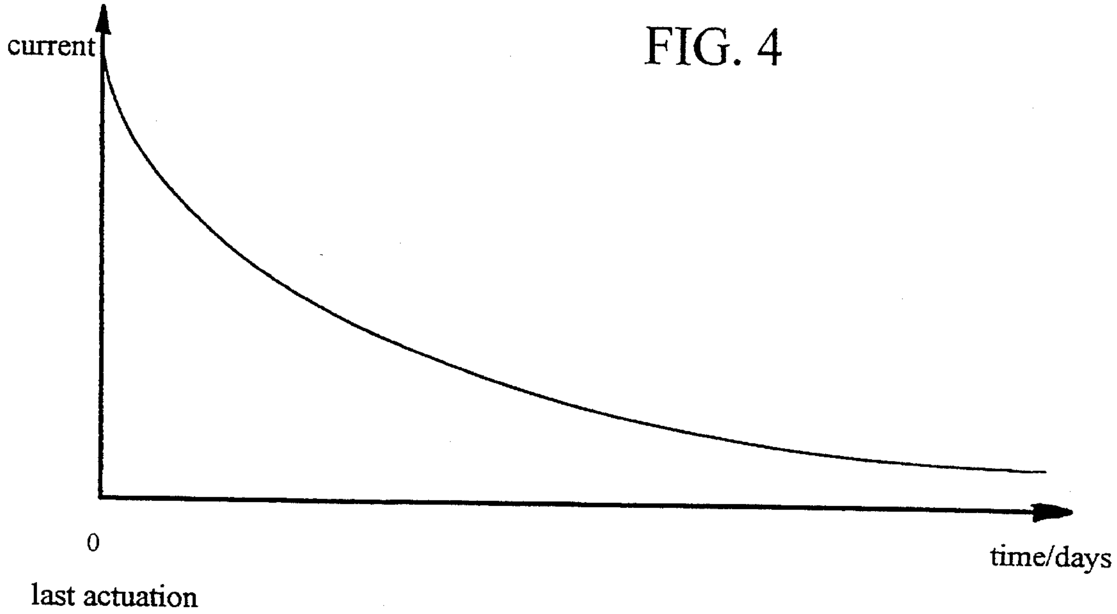
FIG. 4 is an illustration of the averaged current consumption of a further embodiment of the invention.

Referring now to FIG. 4 and the bottom synch line in FIG. 5, the reduction in the ON times of the receiver E, as defined by the microprocessor F, may also be continuous. In that case, every time the pause P is lengthened, it may be by one additional clock pulse.

According to the invention, a plurality of successive waiting periods are distinguished from one another. In the first waiting period, which lasts only a few hours or only one to two days, for instance, the power consumption of the receiver E may be relatively high, and as a result the receiver E is always rapidly available to actuate the locking system immediately, once it receives authorized control signals C. However, if the receiver E has not received any authorized control signals C during this first waiting period, then during a following second waiting period the operating switch A is operated in a clocked manner with comparatively long-lasting intervals P between the turn-on pulses Q of the power supply B. The clocking intervals P are longer during the second waiting period than during the first waiting period. During the second waiting period, they each last 100 ms or 2 seconds, for instance. As a result, the receiver E is only briefly supplied with power each time, and the intervals P become longer and longer over time.

Therefore, the invention avoids total discharges of the battery B largely by providing that the power consumption of the receiver is perceptibly reduced from the second waiting period on.

In order to be able to avoid delays in locking system actuations during the first waiting period, which may last only a few hours, a day, or a few days, the intervals P in the first waiting time may be made vanishingly short. Then the operating switch A is accordingly operated in such a way that it supplies the receiver E with power continuously during the first waiting period, but provides intervals P of finite length between the turn-on phases Q in the ensuing second waiting period. That is, in this case, the operating switch A is not operated in clocked fashion until the second waiting period, and as a result during the first waiting period the receiver E is always ready immediately to evaluate any control signals C it has received and accordingly actuate the locking system immediately.

Nevertheless, in order to enable a pronounced savings of power during the first waiting period as well, or in other words in order to enable savings of an especially large amount of the energy stored in the battery B during all of the waiting periods, it is also possible to make the intervals P of finite length in the first waiting period as well, so that the operating switch A in the first waiting period is operated with a higher clock frequency, that is Q-Q-Q, than during the second waiting period. The system becomes especially thrifty from the second waiting period on.

In order to permit especially long waiting periods to be spanned thriftily, it is possible, during further waiting periods after the second waiting period, to make the length of the intervals P even greater than during the second waiting period. Then the intervals P increase further with time and therefore the power consumption decreases further with time. For instance, the intervals may be made five seconds long, or even longer. In the case of such late waiting periods, certain sacrifices on the part of the motor vehicle user may then be called for in order to avoid total discharges as much as possible, yet initially, in the first waiting period, operation according to the invention presents virtually no hindrance to the motor vehicle user.

Initially, some motor vehicle users might be somewhat annoyed if the locking system sometimes responds immediately when the handheld transmitter H is actuated but sometimes responds after a pronounced delay. That is, at the beginning he or she might not yet understand that this has to do with the total length of the waiting periods. In order to annoy the motor vehicle user as little as possible by instilling the fear that his or her locking system might have become defective, the length of the intervals P may increase more or less uniformly with time, instead of increasing in marked stages.

In order to require the operation of the handheld transmitter H only a few times or, for example, only a single time, to actuate the locking system, despite relatively long intervals P, the coded control signals C may be repeatedly and successively transmitted by the handheld transmitter H over a relatively long transmission period, even if a tripper device of the transmitter H is actuated only once. In that case it is advantageous to make the lengths of the intervals P shorter than the length of the transmission. If the receiver E receives fractions of signals during its brief turn-on phase Q, then the receiver E is connected to the battery B temporarily, at least during the entire length of reception of a complete code, through the operating switch A, so that the receiver E can then check the authorization of the received code.

Another mode of the invention makes it possible to continue the power-saving clocked operation unimpeded, even if the receiver E of the parked motor vehicle K receives control signals C that each contain only an unauthorized code, because they are actually only intended for other motor vehicles or in other words for actuating the locking systems of other motor vehicles. To that end, it is possible after such control signals C have been received, that is signals that do not contain the code authorized for actuating the locking system, to make the clock frequency Q-Q-Q for the actuation of the operating switch A at least approximately the same again as it would have been if this control signal C had not been received. In this way, the reception of an unauthorized code is prevented from immediately tripping the beginning of the first waiting period again and thus beginning a period of high power consumption again.

In order to be able to have the first waiting period begin again at the right time after the motor vehicle has been used again, it is possible after the reception of such control signals C that contain the code which is authorized for actuating the locking system, to make the clock frequency Q-Q-Q of the actuation of the operating switch A again match the usual power supply mode for the ensuing first waiting period.

In order to avoid a total discharge of the battery B with increased certainty, it is possible after the motor vehicle K is used again, not to have the first waiting period begin again until the battery of the motor vehicle has recharged. To that end, after control signals C that do contain the code authorized for actuating the locking system are received, the clock frequency Q-Q-Q for actuating the operating switch A can be made to again match the clock frequency Q-Q-Q of such actuations that occurs during the first waiting period only after the motor vehicle engine has first been started.

With even greater reliability, a total discharge of the battery B can be avoided by having the first waiting time not begin again until the motor vehicle battery has recharged sufficiently. To that end, during waiting periods, such as from the first waiting period on, the voltage of the battery B can be measured at least from time to time, and the interval P can then be defined as a function of the measured voltage of the battery B. In this first mode, the clock frequency Q-Q-Q of the actuation of the operating switch A is accordingly not always equal during the first waiting period or in other words immediately when parking begins. Instead, this clock frequency is also dependent on the present charging status of the battery B at a given time. For instance, immediately after parking, a power supply mode is used that corresponds to the second or even a later waiting period. Then in even later waiting periods, the clock frequency Q-Q-Q may optionally be reduced even further.

In order to make it possible to perform the method of the invention at little effort or expense, the locking system mounted in the motor vehicle K may include the timer F, for instance, directly in the housing of the receiver E, which is intended to operate the operating switch A in a clocked fashion during the applicable waiting periods.

In order to name one example for the structure of such a timer F that requires little effort or expense, it can be pointed out that the timer F may include or represent a flip-flop, for example. However, the timer may also be an electronic counter, a clock, or the like, for example.

In order not to have to change the frequency of the timer F in later waiting periods, the later decrease in the clock frequency Q-Q-Q, or in other words the later prolongation of the intervals P, can also be achieved by providing that the timer F includes a frequency demultiplier.

In order to offer a reliable power supply to the timer F that is unimpaired by the clocking of the power supply B of the receiver E, at little effort and expense, the timer F may include a storage capacitor, which stores an operating energy required for operating the timer F, at least until the next actuation of the operating switch A. In this way, it is unnecessary for the timer F to have its own continuous direct power supply I, such as the direct power supply I of the timer F suggested by dashed lines in FIG. 2. Instead, the power supply of the timer F can then also be accomplished through the operating switch A.

Figure 6:
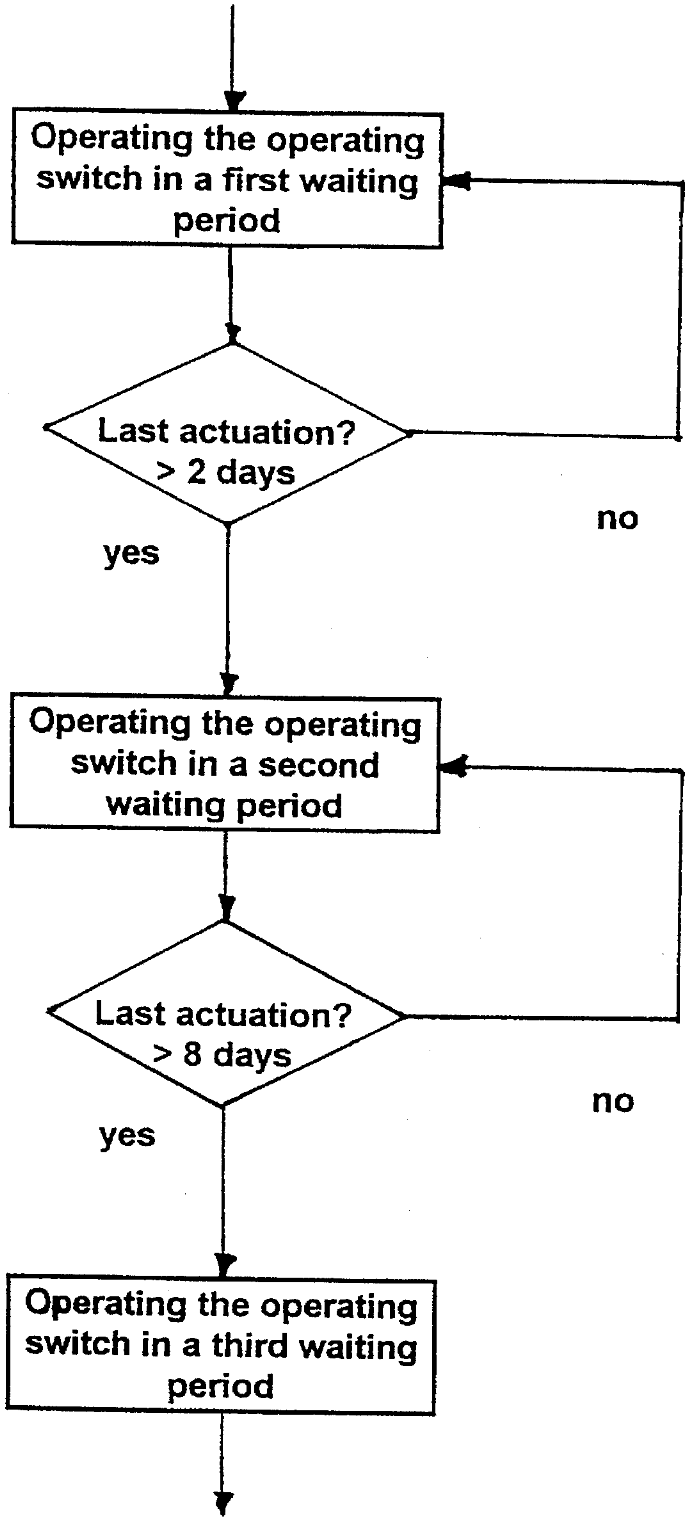
FIG. 6 is a flow chart of the method according to the invention.

With reference to FIG. 6, the microprocessor which governs the duty cycle of the switch A may be programmed to perform any desired program which defines several clock functions simultaneously. In a first step, the operating switch A is operated in a first waiting period either continuously closed or with only brief opening pulses P. In a second step, the program is queried with regard to the time which has lapsed since the receiver has received the proper signal from the proper transmitter H. In a normal situation, the program may loop through the first two steps for several days or even weeks, depending on the frequency with which the vehicle is used. When, finally, the query in the second step leads to an affirmative answer, the program continuous on to the second waiting period, in which the receiver consumes yet less power as compared to the first waiting period. The program sequence loops back to the start upon the next time the vehicle is operated.

I claim:

1. In a process for operating an electronic motor vehicle locking system including a receiver being mounted in the motor vehicle, being supplied by a battery power supply, and being remote-controlled by a handheld transmitter supplying coded control signals, and an operating switch for turning the power supply to the receiver on and off, a method for the clocked actuation of the operating switch, which comprises:

operating the operating switch during a first waiting period with given intervals between turn-ons of the power supply, during which given intervals no power is supplied to the receiver; and subsequently, if the receiver received no control signals during the first waiting period, operating the operating switch in a clocked fashion during a second waiting period with intervals between the turn-ons of the power supply being longer than the given intervals in the first waiting period.

2. The method according to claim 1, which comprises remotely controlling the receiver with infrared light control signals.

3. The method according to claim 1, which comprises remotely controlling the receiver with radio control signals.

4. The method according to claim 1, which comprises setting the intervals to be vanishingly short in the first waiting period so that the operating switch supplies the receiver with power continuously during the first waiting period, and setting the intervals to have finite length between turn-on phases in the second waiting period so that the operating switch is operated in clocked fashion.

5. The method according to claim 1, which comprises setting the intervals in the first waiting period to have finite size so that the operating switch is operated at a higher clock frequency in the first waiting period than during the second waiting period.

6. The method according to claim 4, which comprises increasing the length of the clock intervals even further during other waiting periods after the second waiting period.

7. The method according to claim 5, which comprises increasing the length of the clock intervals even further during other waiting periods after the second waiting period.

8. The method according to claim 4, which comprises increasing the length of the clock intervals substantially uniformly with time.

9. The method according to claim 5, which comprises increasing the length of the clock intervals substantially uniformly with time.

10. The method according to claim 6, which comprises increasing the length of the clock intervals substantially uniformly with time.

11. The method according to claim 7, which comprises increasing the length of the clock intervals substantially uniformly with time.

12. The method according to claim 1, which comprises repeatedly transmitting the coded control signals in succession from the handheld transmitter during a transmission period upon a single actuation of a tripping device of the handheld transmitter, setting the clock intervals to last a shorter time than the transmission period, and temporarily supplying the receiver with power through the operating switch, at least during an entire duration of a reception of a complete code, if fractional signals are received.

13. The method according to claim 1, which comprises receiving control signals which do not contain a code authorized for actuating the locking system, and then setting the clock frequency of the actuation of the operating switch to be at least approximately the same as it would have been without receiving the control signals which do not contain the code authorized for actuating the locking system.

14. The method according to claim 1, which comprises receiving control signals which contain a code that is authorized for actuating the locking system, and then setting the clock frequency of the actuation of the operating switch to match the clock frequency of actuations that prevail during the first waiting period.

15. The method according to claim 1, which comprises receiving control signals which contain a code that is authorized for actuating the locking system, and then setting the clock frequency of the actuation of the operating switch to not match the clock frequency of the actuations that prevail during the first waiting period again until the motor vehicle engine has been started first.

16. The method according to claim 1, which comprises measuring the voltage of the battery at least periodically during waiting periods, and defining the interval as a function of the measured voltage of the battery.

17. The method according to claim 16, which comprises measuring the voltage of the battery from the second waiting period on.

18. In an electronic motor vehicle locking system including a receiver being mounted in the motor vehicle, a battery power supply for supplying the receiver, a remote-controlled handheld transmitter for supplying the receiver with coded control signals, and an operating switch for turning the power supply to the receiver on and off, an apparatus for the clocked actuation of the operating switch, comprising a timer, said timer operating the operating switch during a first waiting period with given intervals between turn-ons of the power supply; and, if the receiver received no control signals during the first waiting period, said timer operating the operating switch in a clocked fashion during a second waiting period immediately following the first waiting period with intervals between the turn-ons of the power supply being longer than the given intervals.

19. The apparatus according to claim 18, wherein said timer includes a flip-flop.

20. The apparatus according to claim 18, wherein said timer includes a frequency demultiplier for reducing the clock frequency of said timer.

21. The apparatus according to claims 18, wherein said timer includes a storage capacitor for storing operating energy for operating said timer being required at least until the next actuation of the operating switch.

* * * * *